US012658425B2

(12) United States Patent
    Sakitani et al.

(10) Patent No.: US 12,658,425 B2
(45) Date of Patent: Jun. 16, 2026

(54) POSITIVE ELECTRODE FOR NONAQUEOUS ELECTROLYTE SECONDARY BATTERIES, AND NONAQUEOUS ELECTROLYTE SECONDARY BATTERY

(71) Applicant: SANYO Electric Co., Ltd., Kadoma (JP)

(72) Inventors: Nobuhiro Sakitani, Tokushima (JP); Koki Morita, Tokushima (JP); Shun Nomura, Osaka (JP); Hiroyuki Fujimoto, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 609 days.

(21) Appl. No.: 18/021,993

(22) PCT Filed: Aug. 19, 2021

(86) PCT No.: PCT/JP2021/030301
    § 371 (c)(1),
    (2) Date: Feb. 17, 2023

(87) PCT Pub. No.: WO2022/044935
    PCT Pub. Date: Mar. 3, 2022

(65) Prior Publication Data
    US 2023/0246168 A1      Aug. 3, 2023

(30) Foreign Application Priority Data
    Aug. 28, 2020     (JP) ................................. 2020-144040

(51) Int. Cl.
    *H01M 4/36*          (2006.01)
    *H01M 4/02*          (2006.01)
    *H01M 4/485*         (2010.01)

(52) U.S. Cl.
    CPC ........... *H01M 4/364* (2013.01); *H01M 4/485* (2013.01); *H01M 2004/021* (2013.01); *H01M 2004/028* (2013.01)

(58) Field of Classification Search
    CPC .......... H01M 4/36; H01M 4/364; H01M 4/48; H01M 4/485
    See application file for complete search history.

(56) References Cited

U.S. PATENT DOCUMENTS

2013/0147439 A1      6/2013   Takahashi
2020/0006767 A1      1/2020   Du et al.
                    (Continued)

FOREIGN PATENT DOCUMENTS

CN          110660961 A      1/2020
JP          2013-120736 A    6/2013
                    (Continued)

OTHER PUBLICATIONS

International Search Report dated Oct. 12, 2021, issued in counterpart International Application No. PCT/JP2021/030301 (2 pages).
(Continued)

*Primary Examiner* — Karie O'Neill Apicella
(74) *Attorney, Agent, or Firm* — WHDA, LLP

(57) ABSTRACT

A nonaqueous electrolyte secondary battery provided with a positive electrode, a negative electrode and a nonaqueous electrolyte. An electrode mixture layer of the positive electrode contains: first lithium metal composite oxide particles that are non-aggregated particles which have a volume-based median diameter of from 2 μm to 10 μm; and second lithium metal composite oxide particles that are secondary particles, in each of which primary particles having an average particle diameter of from 50 nm to 2 μm aggregate, and which have a volume-based median diameter of from 10 μm to 30 μm. With a first region and the second region
(Continued)

sequentially halved from the surface side of the positive electrode mixture layer, the content of the first lithium metal composite oxide particles in the first region is higher than the content of the first lithium metal composite oxide particles in the second region.

5 Claims, 2 Drawing Sheets

(56)　　　　　　　References Cited

U.S. PATENT DOCUMENTS

2020/0014023 A1 *　1/2020　Ko ........................ H01M 4/131
2021/0210757 A1　　7/2021　Hosono et al.

FOREIGN PATENT DOCUMENTS

| JP | 2020-53386 A | 4/2020 |
| WO | 2018/150843 A1 | 8/2018 |
| WO | 2021/153397 A1 | 8/2021 |

OTHER PUBLICATIONS

Office Action dated Nov. 28, 2024, issued in counterpart CN application No. 202180050509.5, with English translation. (10 pages).

* cited by examiner

POSITIVE ELECTRODE FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. 8371 of International Application No. PCT/JP2021/030301 filed on Aug. 19, 2021 which claims the benefit of priority under 35 U.S.C. § 119 (a) of Japanese Patent Application No. 2020-144040 filed in Japan on Aug. 28, 2020, the contents of which are incorporated herein by reference.

TECHNICAL FIELD

The present disclosure relates to a positive electrode for a non-aqueous electrolyte secondary battery and a non-aqueous electrolyte secondary battery using the positive electrode.

BACKGROUND ART

With the spread of non-aqueous electrolyte secondary batteries for on-vehicle use and storage use in recent years, a non-aqueous electrolyte secondary battery having a high capacity and excellent cycle characteristics has been required. Since a positive electrode significantly affects battery characteristics including the batter capacity and the cycle characteristics, many investigations have been made on the positive electrode. For example, Patent Literature 1 discloses a non-aqueous electrolyte secondary battery using single crystal particles being non-aggregated particles and/ or secondary particles formed by aggregation of a plurality of primary particles as a positive electrode active material. Patent Literature 1 describes an effect of improvement of the battery cycle characteristics.

CITATION LIST

Patent Literature

PATENT LITERATURE 1: Japanese Unexamined Patent Application Publication No. 2020-53386

SUMMARY

Technical Problem

However, according to intensive studies by the present inventors, it has been found that using the non-aggregated particles as the positive electrode active material improves the cycle characteristics but lowers the battery capacity due to decrease in a filling property of the positive electrode active material. Meanwhile, it has been found that using the secondary particles as the positive electrode active material deteriorates the cycle characteristics compared with using the non-aggregated particles. Furthermore, even when a mixture of the non-aggregated particles and the secondary particles, at least one of the high capacity and the good cycle characteristics cannot be achieved.

It is an advantage of the present disclosure to provide a non-aqueous electrolyte secondary battery having a high capacity and excellent cycle characteristics.

Solution to Problem

A positive electrode for a non-aqueous electrolyte secondary battery of an aspect of the present disclosure comprises: a positive electrode core; and a positive electrode mixture layer formed on a surface of the positive electrode core. The positive electrode mixture layer includes: first lithium-metal composite oxide particles being non-aggregated particles having a median diameter an a volumetric basis of 2 to 10 μm; and second lithium-metal composite oxide particles being secondary particles formed by aggregation of primary particles having an average particle diameter of 50 nm to 2 μm, the secondary particles having a median diameter on a volumetric basis of 10 to 30 μm, and when the positive electrode mixture layer is bisected in a thickness direction and is defined as a first region and a second region in this order from a surface side of the positive electrode mixture layer, a content of the first lithium-metal composite oxide particles in the first region is larger than a content of the first lithium-metal composite oxide particles in the second region.

A non-aqueous electrolyte secondary battery of an aspect of the present disclosure comprises: the above positive electrode; a negative electrode and a non-aqueous electrolyte.

Advantageous Effect of Invention

According to an aspect of the present disclosure, a non-aqueous electrolyte secondary battery having a high capacity and excellent cycle characteristics can be provided.

DESCRIPTION OF EMBODIMENTS

Figure 1:
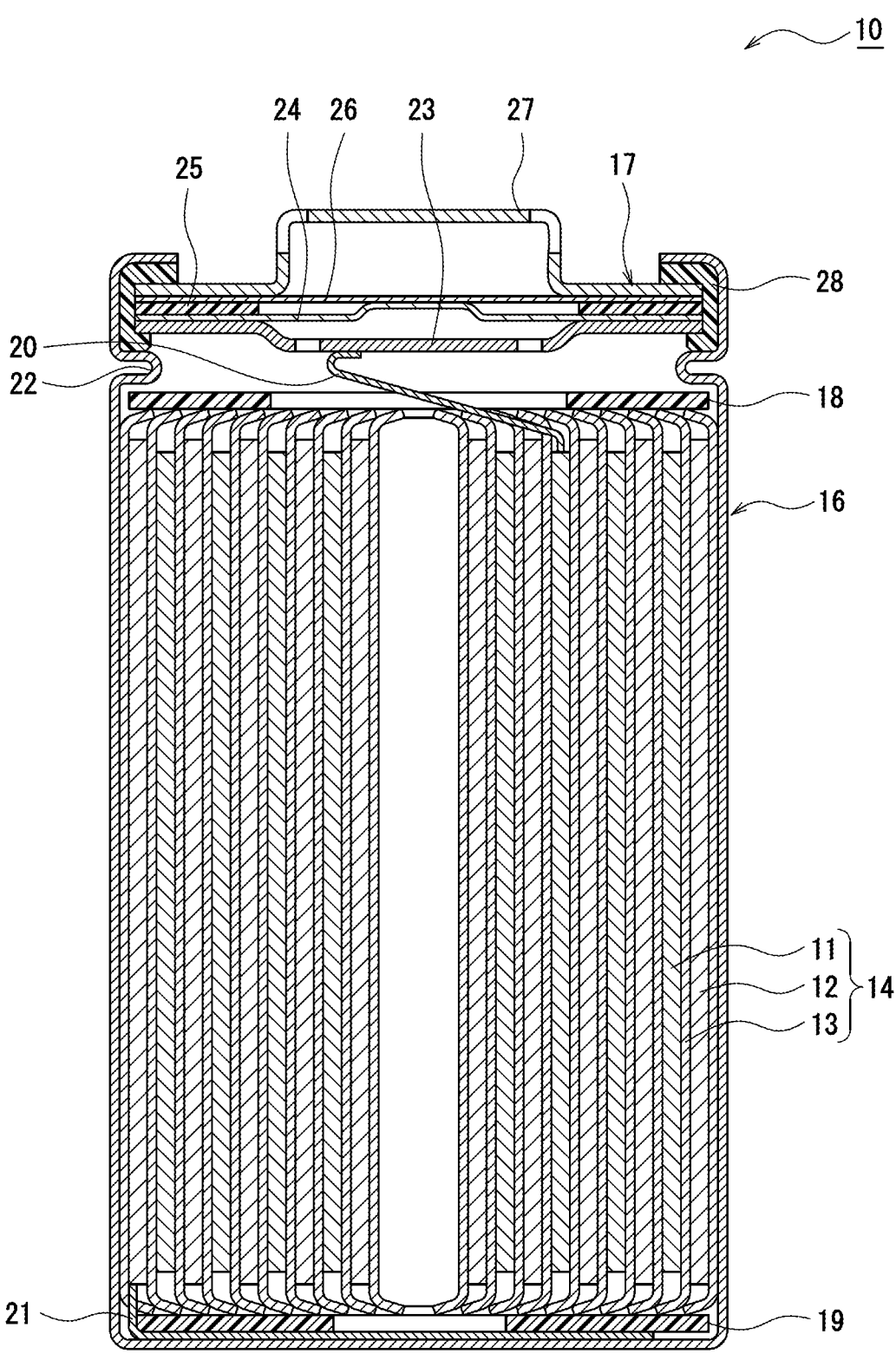
FIG. 1 is a sectional view of a non-aqueous electrolyte secondary battery of an example of an embodiment.
Figure 2:
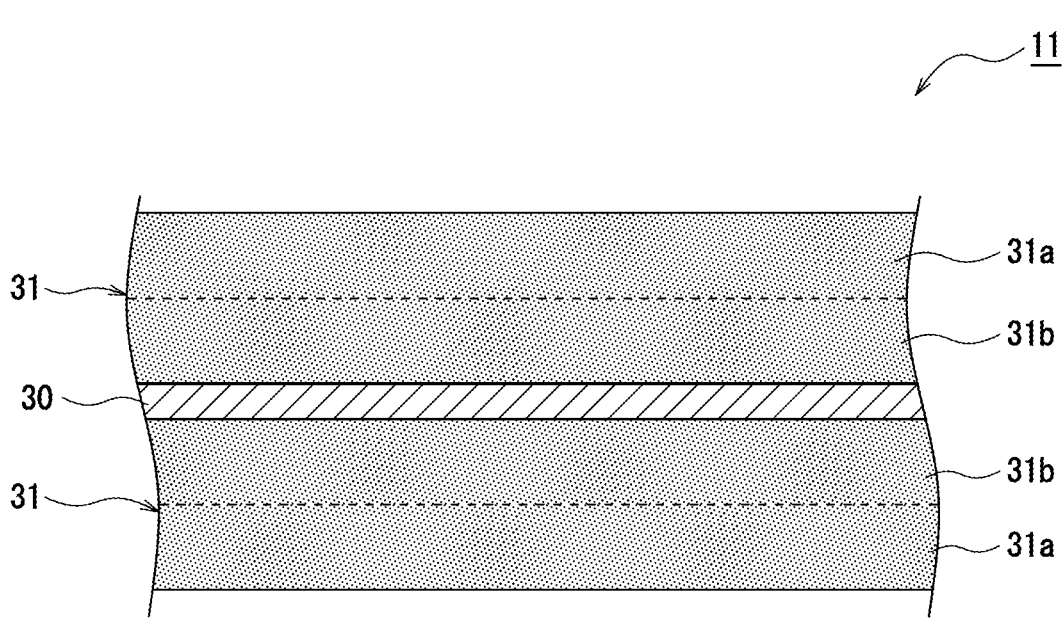
FIG. 2 is a sectional view of a positive electrode of an example of an embodiment.

As described above, it is an important challenge to achieve both a high capacity and excellent cycle characteristics of a non-aqueous electrolyte secondary battery. The present inventors have made intensive investigation to solve this challenge, and have consequently' found that the non-aqueous electrolyte secondary battery having a high capacity and excellent cycle characteristics can be obtained by using specific non-aggregated particles and specific secondary particles in combination as a positive electrode active material and setting a content (mass) of the non-aggregated particles on a surface side to be higher than that on a core side of the positive electrode mixture layer.

Using the non-aggregated particles singly as the positive electrode active material improves the cycle characteristics, but lower the battery capacity due to decrease in a filling property of the positive electrode active material. Meanwhile, using the secondary particles are likely to cause particle cracking in a step of compressing the positive electrode, and space between the particles to be a pathway of an electrolyte liquid is blocked with the cracked particles. Thus, the filling density of the active material is increased, but the cycle characteristics deteriorate. Even when a mixture of the non-aggregated particles and the secondary particles are used, at least one of these characteristics cannot be achieved.

That is, when the non-aggregated particles in the positive electrode mixture layer satisfy a relationship "the content of the non-aggregated particles in the first region, on the surface side, of the positive electrode mixture layer>the content of the non-aggregated particles in the second region, on the core side, of the positive electrode mixture layer", both of the high capacity and the excellent cycle characteristics are specifically achieved. In this case, it is considered that the pathway of the electrolyte liquid may be achieved in the positive electrode mixture layer to improve the cycle characteristics and the filling density of the active material may be increased to increase the capacity.

Hereinafter, an example of an embodiment of the positive electrode for a non-aqueous electrolyte secondary battery according to the present disclosure, and a non-aqueous electrolyte secondary battery using the positive electrode will be described in detail with reference to the drawings. Selective combinations of a plurality of embodiments and modified examples, described below, are anticipated in advance.

Hereinafter, a cylindrical battery in which a wound electrode assembly 14 is housed in a bottomed cylindrical exterior housing can 16 will be exemplified, but an exterior of the battery is not limited to a cylindrical exterior housing can, and may be, for example, a rectangular exterior housing can (rectangular battery), a Cola-shaped exterior housing can (coin battery), or an exterior composed of laminated sheets including a metal layer and a resin layer (pouch-type battery). The electrode assembly may be a laminated electrode assembly in which a plurality of positive electrodes and a plurality of negative electrodes are alternately stacked with a separator interposed therebetween.

FIG. 1 is a sectional view of a non-aqueous electrolyte secondary battery 10 of an example of an embodiment. As illustrated in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an direction, and the opening of the exterior housing can 16 is sealed with a sealing assembly 17. Hereinafter, far convenience of description, the sealing assembly 17 side of the battery will be described as the upper side, and the bottom side of the exterior housing can 16 will be described as the lower side.

All of the positive electrode 11, negative electrode 12, and separator 13 that constitute the electrode assembly 14 have an elongated band-shape, and are spirally wound to be alternately stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 comprises: a positive electrode lead 20 connected to the positive electrode 11 by welding or the like, and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends along an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a groove 22 in which part of a side wall thereof projects inside for supporting the sealing assembly 17 is formed. The groove 22 is preferably formed in a circular shape along a circumferential direction of the exterior housing can 16, and supports the sealing assembly 17 with the upper surface thereof. The sealing assembly 17 is fixed on the upper part of the exterior housing can 16 with the groove 22 and with an end of the opening of the exterior housing can 16 caulked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected to each other. The lower vent member 24 and they upper vent member 26 are connected at respective central parts thereof, and the insulating member 25 is interposed between the respective circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off If the internal pressure further increases, the upper vent member 26 breaks, and gas is discharged through the cap 27 opening.

Hereinafter, the positive electrode 11, the negative electrode 12, the separator 13, and the non-aqueous electrolyte, particularly the positive electrode 11 will be described in detail.

[Positive Electrode]

The positive electrode 11 comprises a positive electrode core 30 and a positive electrode mixture layer 31 formed on a surface of the positive electrode core 30. For the positive electrode core 30, a foil of a metal stable within a potential range of the positive electrode 11, such as aluminum and an aluminum alloy, a film in which such a metal is disposed on a surface layer, and the like may be used. An example of the positive electrode core 30 is foil of aluminum or an aluminum alloy having a thickness of 10 to 20 μm. The positive electrode mixture layer 31 includes the positive electrode active material, a conductive agent, and a binder, and preferably formed on both the surfaces of the positive electrode core 30. A thickness of the positive electrode mixture layer 31 is, for example, 30 to 100 μm on one side of the positive electrode core 30. The positive electrode 11 may be produced by, for example applying a positive electrode mixture slurry including the positive electrode active material, the conductive agent, the binder, and the like on the positive electrode core 30, and drying and then compressing the coating film to form the positive electrode mixture layers 31 on both the surfaces of the positive electrode core 30.

Examples of the conductive agent included in the positive electrode mixture layer 31 include carbon materials such as carbon black, acetylene black, Ketjenblack, graphite, carbon nanotube, carbon nanofiber, and graphene. A content of the conductive agent is, for example, 0.01 to 10 parts by mass, and preferably 0.05 to 5 parts by mass, based on 100 parts by mass of the positive electrode active material.

Examples of the binder included in the positive electrode mixture layer 31 include fluorine-containing resins such as polytetrafluoroethylene (PTFE) and polyvinylidene fluoride (PVdF), polyacrylonitrile (PAN), a polyimide, an acrylic resin, and a polyolefin. These resins may be used in combination with carboxymethylcellulose (CMC) or a salt thereof, polyethylene oxide (PEO), and the like. A content of the binder is, for example, 0.1 to 10 parts by mass, and preferably 0.5 to 5 parts by mass, based on 100 parts by mass of the positive electrode active material.

The positive electrode mixture layer 31 includes a particle lithium-metal composite oxide as the positive electrode active material. The lithium-metal composite oxide is a composite oxide containing metal elements such as Co, Mn, Ni, and Al, in addition to Li. The metal element constituting the lithium-metal composite oxide is, for example, at least one selected from the group consisting of Mg, Al, Ca, Sc, Ti, V, Cr, Mn, Fe, Co, Ni, Cu, Zn, Ga, Ge, Y, Zr, Sn, Sb, W, Pb, and Bi. Among them, at least one selected from the group consisting of Co, Ni, and Mn is preferably contained. An example of a preferable composite oxide is a lithium-metal composite oxide containing Ni, Co, and Mn, or a lithium-metal composite oxide containing Ni, Co, and Al.

The positive electrode mixture layer 31 includes two kinds of lithium-metal composite oxide particles. When the positive electrode mixture layer 31 is bisected in a thickness direction and is defined as a first region 31a and a second region 31b in this order from a surface side of the positive electrode mixture layer 31, materials included in the first region 31a and the second region 31b are different from each other. In the present embodiment, when the first region 31a, and the second region 31b contain the different kinds of the lithium-metal composite oxide particles and each region contains the two kinds of the lithium-metal composite oxide particles, mass ratios thereof being different. On the other hand, kinds and contents of the conductive agent and the binder may be same as or different from the first region 31a and the second region 31b.

The positive electrode mixture layer 31 includes: first lithium-metal composite oxide particles being non-aggregated particles; and second lithium-metal composite oxide particles being secondary particles formed by aggregation of primary particles having an average particle diameter of 50 nm to 2 μm. As the positive electrode active material, the positive electrode mixture layer 31 may contain only the first and second lithium-metal composite oxide particles, and may contain a third lithium-metal composite oxide particles within a range not impairing the object of the present disclosure. An example of the third lithium-metal composite oxide particles includes composite oxide particles not satisfying a condition of a particle diameter described later. A median diameter on a volumetric basis (hereinafter, which may be referred to as "D50") of the first lithium-metal composite oxide particles is 2 to 10 μm, and preferably 3 to 8 μm. D50 of the second lithium-metal composite oxide particles is 10 to 30 μm, and preferably 12 to 20 μm. The D50 means a particle diameter at which a cumulative frequency is 50% from a smaller particle diameter side in a particle size distribution on a volumetric basis. The particle size distribution of the lithium-metal composite oxide particles may be measured by using a laser diffraction-type particle size distribution measuring device (for example, MT3000II, manufactured by MicrotracBEL Corp.) with water as a dispersion medium.

The first lithium-metal composite oxide particles, which are particles having no particle boundary inside thereof, are primary particles of a single crystal, for example. The crystallinity of the lithium-metal composite oxide particles may be confirmed by using a scanning ion microscope. Note that, the first lithium-metal composite oxide particles synthesized by a manufacturing method described later ma include particles including five or fewer primary particles, for example.

The second lithium-metal composite oxide particles are secondary particles formed by aggregation of primary particles having an average particle diameter of 50 μm to 2 μm, preferably 500 nm to 2 μm. In the second lithium-metal composite oxide particles, there is a particle boundary of the primary particles. The primary particles may be confirmed by observing the second lithium-metal composite oxide particles with a scanning electron microscope (SEM). Note that, the plurality of the primary particles is adhered each other with strength so as not to be disintegrated by applying a strong, force during, for example, crushing after synthesizing the second lithium-metal composite oxide particles and preparing the positive electrode mixture slurry.

The average particle diameter of the primary particles constituting the second lithium-metal composite oxide particles is determined by analyzing a SEM image of a particle cross section. For example, the positive electrode 11 is embedded in a resin, the cross section is produced by cross-section polisher (CP) processing, and this cross section is photographed with an SEM. From the SEM image, 30 primary particles are randomly selected to observe the particle boundary, and a diameter of a circumscribed circle of each of the 30 primary particles is determined to specify an average value thereof as the average particle diameter.

Each of the lithium, metal composite oxide particles may be synthesized by a method described in Example, described later. The first lithium-metal composite oxide particles may be synthesized by setting a pH of an alkaline aqueous solution used for synthesizing a precursor including Ni, Co, Mn, Al, and the like (metal composite hydroxide) to be higher and/or setting a calcination temperature of the precursor to be higher than those in a case of synthesis of the second lithium-metal composite oxide particles, for example. An example of a preferable pH of the alkaline aqueous solution is 10 to 11, and an example of a preferable calcination temperature is 950 to 1100° C. When the second lithium-metal composite oxide particles are synthesized, an alkaline aqueous solution having a pH of 9 to 10 is used, and the calcination temperature is set to be 950° C. or lower, for example.

Each of the lithium-metal composite oxide particles is constituted of, for example, a lithium-metal composite oxide having a hexagonal crystalline structure belonging to the space group R-3m, and preferably constituted of $LiNi_xCo_yMn_zO_2$ ($0.3<x<0.6$, $x+y+z =1$) or $LiNi_xCo_yAl_zO_2$ ($0.8<x<0.95$, $x+y+z=1$) as a main component. Here, the main component means a component at the largest mass among components constituting the lithium-metal composite oxide particles. Compositions of each of the lithium-metal composite oxide particles may be same as or different from each other.

Although the positive electrode mixture layer 31 contains the first and second lithium-metal composite oxide particles, as described above, the materials included in the first region 31$a$ and the second region 31$b$ are different from each other. A content of the first lithium-metal composite oxide particles in the positive electrode mixture layer 31 is not uniform. The content in the first region 31$a$ is larger than that in the second region 31$b$.

The first lithium-metal composite oxide particles more hardly cause particle cracking than the second lithium-metal composite oxide particles during the step of manufacturing the positive electrode 11. Thus, a larger amount of these first lithium-metal composite oxide particles being present in the first region 31$a$, on the surface side of the positive electrode mixture layer 31, achieves a pathway of the electrolyte liquid in the first region 31$a$. In this case, it is considered that the electrolyte liquid has good permeability into the second region 31$b$ to improve the cycle characteristics.

A proportion of the mass of the first lithium-metal composite oxide particles to the mass of the positive electrode active material in the first region 31$a$ is preferably larger than a proportion of the mass of the first lithium-metal composite oxide particles to the mass of the positive electrode active material in the second region 31$b$. Contents of the positive electrode active material in the first region 31$a$ and the second region 31$b$ may be different, but preferably substantially the same. The content of the positive electrode active material is, for example, 90 to 99.9 mass %, and preferably 95 to 99 mass %, based on the mass of the positive electrode mixture layer 31.

The first region 31$a$ may contain substantially only the first lithium-metal composite oxide particles as the positive electrode active material. For example, the first lithium-metal composite oxide particles may be contained only in the first region 31$a$ and not in the second region 31$b$. When the second lithium-metal composite oxide particles are present in the first region 31$a$ each of the composite oxide particles in the first region 31$a$ preferably satisfies a relationship "the content of the first lithium-metal composite oxide particles>the content of the second lithium-metal composite oxide particles".

The content of the second lithium-metal composite oxide particles in the second region 31$b$ is larger than that in the first region 31$a$. A proportion of the mass of the second lithium-metal composite oxide particles to the mass of the positive electrode active material in the second region 31$b$ is preferably larger than a proportion of the mass of the second lithium-metal composite oxide particles to the mass of the positive electrode active material in the first region 31$a$.

The second lithium-metal composite oxide particles may be filled at a large amount per unit volume compared with the first lithium-metal composite oxide particles. Thus, using these second lithium-metal composite oxide particles may densify the positive electrode mixture layer 31 to contribute to the higher battery capacity: A larger amount of the second lithium-metal composite oxide particles being present on the positive electrode core 30 side, which has a small effect on the permeability of the electrolyte liquid into the positive electrode mixture layer 31, may maintain the good cycle characteristics and increase the capacity.

The second region 31$b$ may contain substantially only the second lithium-metal composite oxide particles as the positive electrode active material. For example the second lithium-metal composite oxide particles may be contained only in the second region 31$b$ and not in the first region 31$a$. When the first lithium-metal composite oxide particles are present in the second region 31$b$, each of the composite oxide particles in the second region 31$b$ preferably satisfies a relationship "the content of the first lithium-metal composite oxide particles<the content of the second lithium-metal composite oxide particles".

The first region 31$a$ may contain the first and second lithium-metal composite oxide, particles, as described above. In this case, a preferable mass ratio between the first lithium-metal composite oxide particles and the second lithium-metal composite oxide particles in the first region 31$a$ is preferably 60:40 to 90:10, and more preferably 65:35 to 80:20. When the mass ratio between each of the composite oxide particles is within the above range, both of the high capacity and the excellent cycle characteristics are easily achieved.

The second region 31$b$ may have the same contents of the first and second lithium-metal composite oxide particles, but is preferably set to be "the content of the first lithium-metal composite oxide particles<the content of the second lithium-metal composite oxide particles", or only the second lithium-metal composite oxide particles are preferably used as the positive electrode active material. When the second region 31$b$ contains the first lithium-metal composite oxide particles, a mass ratio between the first lithium-metal composite oxide particles and the second lithium-metal composite oxide particles in the second region 31$b$ is preferably 10:90 to 40:60, and more preferably 20:80 to 35:65. When the mass ratio between each of the composite oxide particles is within the above range, both of the high capacity and the excellent cycle characteristics are easily achieved.

[Negative Electrode]

The negative electrode 12 comprises a negative electrode core and a negative electrode mixture layer formed on a surface of the negative electrode core. For the negative electrode core, a foil of a metal stable within a potential range of the negative electrode 12, such as copper and a copper alloy, a film in which such a metal is disposed on a surface layer, and the like may be used. An example of the negative electrode core is foil of copper or copper alloy having a thickness of 5 to 15 $\mu$m. The negative electrode mixture layer includes the negative electrode active material and a binder, and preferably formed on both the surfaces of the negative electrode core. A thickness of the negative electrode mixture layer is, for example, 30 to 100 $\mu$m on one side of the negative electrode core. The negative electrode 12 may be produced by applying a negative electrode mixture slurry including the negative electrode active material, the binder, and the like on the negative electrode core, and drying and then compressing the coating film to form the negative electrode mixture layers on both the surfaces of the negative electrode core.

The negative electrode mixture layer includes, for example, a carbon-based active material to reversibly occlude and release lithium ions, as the negative electrode active material. A preferable carbon-based active material is a graphite such as: a natural graphite such as flake graphite, massive graphite, and amorphous graphite; or an artificial graphite such as massive artificial graphite (MAG) and graphitized mesophase-carbon microbead (MCMB). For the negative electrode active material, a Si-based active material composed of at least one of the group consisting of Si and a Si-containing compound may also be used, and the carbon-based active material and the Si-based active material may be used in combination.

For the binder included in the negative electrode mixture layer, fluorine-containing resins such as PTFE and PVdF, PAN, a polyimide, an acrylic resin, a polyolefin, styrene-butadiene rubber (SBR), and the like may be used. The negative electrode mixture layer may include CMC or a salt thereof, polyacrylic acid (PAA) or a salt thereof, polyvinyl alcohol (PVA), and the like. A content of the binder is, for example, 0.1 to 10 parts by mass, and preferably 0.5 to 5 parts by mass, based on 100 parts by mass of the negative electrode active material. With the negative electrode mixture layer, conductive agents such as carbon black, acetylene black, and Ketjenblack may be added.

[Separator]

For the separator 13, a porous sheet having an ion permeation property and an insulation property is used. Specific examples of the porous sheet include a fine porous thin film, a woven fabric, and a nonwoven fabric. For a material of the separator, a polyolefin such as polyethylene, and polypropylene, cellulose, and the like are preferable. The separator 13 may have a single-layered structure or a multilayered structure. On a surface of the separator 13, a resin layer having high heat resistance, such as an aramid resin, may be formed.

On a boundary between the separator 13 and least one selected from the positive electrode 11 and the negative electrode 12, a filler layer including an inorganic filler may be formed. Examples of the inorganic filler include oxides containing a metal such as Ti Al, Si, and Mg, and a phosphoric acid compound. The filler layer may be formed by applying a slurry containing the filler on the surface of the positive electrode 11, the negative electrode 12, or the separator 13.

[Non-Aqueous Electrolyte]

The non-aqueous electrolyte includes a non-aqueous solvent and an electrolyte salt dissolved in the non-aqueous solvent. For the non-aqueous solvent, esters, ethers, nitriles such as acetonitrile, amides such as dimethylformamide, a mixes solvent of two or more thereof, and the like may be used, for example. The non-aqueous solvent may contain halogen-substituted derivative in which hydrogen of these solvents is at least partially substituted with a halogen atom such as fluorine. Examples of the halogen-substituted derivative include fluorinated cyclic carbonates such as fluoroethylene carbonate (FEC), fluorinated chain carbonates, and fluorinated chain carboxylates such as methyl fluoropropionate (FMP).

Examples of the esters include: cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as $\gamma$-butyrolactone (GBL) and $\gamma$-valerolactone (GVL); and chain carboxylates such as methyl acetate, ethyl acetate, propyl acetate, methyl propionate (MP), and ethyl propionate.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether. Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibeuzyl ether, o-dimethoxybenzene, 1,2-diethoxyethane, 1,2-dibutoxyethane, diethylene glycol dimethyl ether, diethylene glycol diethyl ether, cliethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, and n represents 1 or 2), $LiB_{10}Cl_{10}$, LiCl, LiBr, LiI, chloroborane, a lithium lower aliphatic carboxylate, borate salts such as $Li_2B_4O_7$ and $Li(B(C_2O_4)F_2)$, and imide salts such as $LiN(SO_2CF_3)_2$, and $LiN(C_1F_{2l+1}SO_2)(C_mF_{2m+1}SO_2)$ {1 and m represent integers of 0 or more}. The lithium salts may be used singly, or a plurality types thereof may be mixed to be used. Among them, $LiPF_6$ is preferably used from the viewpoints of ion conductivity, electrochemical stability, and the like. A concentration of the lithium salt is, for example, 0.8 mol to 1.8 mol per litter of the non-aqueoths solvent.

EXAMPLE

Hereinafter, the present disclosure will be described in more detail with Examples, but the present disclosure is not limited to these Examples.

Example 1

[Synthesis of First Lithium-Metal Composite Oxide Particles]

Nickel sulfate, cobalt sulfate, and manganese sulfate were mixed at predetermined proportions, and the mixture was uniformly mixed in an alkaline aqueous solution having a pH of 10 to 11 to produce a precursor. Then, the precursor and lithium carbonate were mixed, the mixture was calcined at a temperature of 1000° C. for 15 hours, and then crushed to obtain first lithium-metal composite oxide particles being non-aggregated particles. A composition and D50 of the particles were as follows.

Composition: $LiNi_{0.5}Co_{0.2}Mn_{0.3}O_2$

D50: 4.5 $\mu$m

[Synthesis of Second Lithium-Metal Composite Oxide Particles]

Second lithium-metal composite oxide particles being secondary particles formed by aggregation of primary particles were obtained in the same manner as in the first lithium-metal composite oxide particles except that: the pH of the alkaline aqueous solution was changed to 9 to 10; and the calcination temperature was changed to 900° C. A composition of the particles, an average particle diameter of the primary particles, and D50 of the secondary particles were as follows.

Composition: $LiNi_{0.5}Co_{0.2}Mn_{0.3}O_2$

Average particle diameter of primary particles: 1.6 $\mu$m

D50 of secondary particles (second lithium-metal composite oxide particles): 14.1 $\mu$m

[Production of Positive Electrode]

The first lithium-metal composite oxide particles, acetylene black (AB), and polyvinylidene fluoride (PVdF) were mixed at a mass ratio of 98:1:1, and an appropriate amount of N-methyl-2-pyrrolidone (NMP) was added as a dispersion medium to prepare a first positive electrode mixture shiny having a solid-content concentration of 70 mass %. In addition, a second positive electrode mixture shiny was prepared in the same manner as the preparation of the first positive electrode mixture slurry except that the second lithium-metal composite oxide particles were used instead of the first lithium-metal composite oxide particles. Then, the second positive electrode mixture slurry was applied on both surfaces of a positive electrode core made of aluminum foil, subsequently the first positive electrode mixture slurry was applied on the coating film of the second positive electrode mixture slurry. The coating film was dried and compressed (linear pressure of 3000 N/m), and then cut to a predetermined electrode size to produce a positive electrode in which positive electrode mixture layers were formed on both surfaces of the positive electrode core. Amounts of the first positive electrode mixture shiny and the second positive electrode mixture slurry applied were the same.

[Production of Negative Electrode]

As the negative electrode active material, a mixture of 95 parts by mass of a graphite powder and 5 parts by mass of a Si-containing compound represented by $SiO_x$ was used. Mixing 100 parts by mass of the negative electrode active material, 1 part by mass of sodium carboxymethylcellulose (CMC-Na), and water was, performed, and 1.2 parts by mass of a styrene-butadiene rubber (SBR) dispersion was further mixed to prepare a negative electrode mixture Amy. Then, the negative electrode mixture slurry was applied on both surfaces of a negative electrode core made of copper foil. The coating film was dried and compressed, and then cut to a predetermined electrode size to produce a negative electrode in which negative electrode mixture layers were formed on both surfaces of the negative electrode core.

[Preparation of Non-Aqueous Electrolyte Liquid]

Ethylene carbonate (EC) and dimethyl carbonate (MAC) were mixed at a volume ratio of 1:3 (25° C.). Into 100 parts by mass of the mixed solvent, 5 parts by mass of vinylene carbonate (VC) was added, and $LiPF_6$ was dissolved so that the concentration was 1 mol/L to prepare a non-aqueous electrolyte liquid.

[Production of Battery]

Lead terminals were attached to each of the above positive electrode and the above negative electrode, and the positive electrode and the negative electrode were spirally wound with a separator interposed therebetween to produce a wound electrode assembly. The electrode assembly was housed in a bottomed cylindrical exterior housing can, the negative electrode lead was welded with a bottom inner surface of the exterior housing can, and the positive electrode lead was welded with an internal terminal plate of a sealing assembly. Thereafter, the above non-aqueous electrolyte was injected into the exterior housing can, an opening edge of the exterior housing can was caulked with the sealing assembly to produce a cylindrical secondary battery Laving a battery capacity of 2500 mAh.

Example 2

A mixture in which the first lithium-metal composite oxide particles and the second lithium-metal composite oxide particles were mixed at a mass ratio of 7:3; AB; and PVdF were mixed at a mass ratio of 98:1:1, and an appropriate amount of NMP was added as a dispersion medium to prepare a first positive electrode mixture slurry having a solid-content concentration of 70 mass %. In addition, a mixture in which the first lithium-metal composite oxide particles and the second lithium-metal composite oxide particles were mixed at a mass ratio of 3:7; AB; and PVdF were mixed at a mass ratio of 98:1:1, and an appropriate amount of NMP was added as a dispersion medium to prepare a second positive electrode mixture shiny having a solid-content concentration of 70 mass %. A positive electrode and a non-aqueous electrolyte secondary battery were produced in the same manner as in Example 1 except that these two kinds of the positive electrode mixture slurries were used in the production of the positive electrode.

Comparative Example 1

A positive electrode and a non-aqueous electrolyte secondary battery were produced in the same manner as in Example 1 except that, in the production of the positive electrode, the first positive electrode mixture slurry was applied and then the second positive electrode mixture slimy was applied.

Comparative Example 2

A positive electrode and a non-aqueous electrolyte secondary battery were produced in the same manner as in Example 1 except that, in the production of the positive electrode, only the first positive electrode mixture shiny was used.

Comparative Example 3

A positive electrode and a non-aqueous electrolyte secondary battery were produced in the same manner as in Example 1 except that, in the production of the positive electrode, only the second positive electrode mixture slurry was used.

Comparative Example 4

A mixture in which the first lithium-metal composite oxide particles and the second lithium-metal composite oxide particles were mixed at a mass ratio of 1:1; AB; and PVdF were mixed at a mass ratio of 98:1:1, and an appropriate amount of NMP was added as a dispersion medium to prepare a positive electrode mixture slurry having a solid-content concentration of 70 mass %. A positive electrode and a non-aqueous electrolyte-secondary battery were produced in the same manner as in Example 1 except that this positive electrode mixture shiny was used in the production of the positive electrode.

The positive electrode and the battery of each of Examples and Comparative Examples were evaluated by the following method. Table 1 shows the evaluation results.

[Density (Filling Density) of Positive Electrode Mixture Layer]

A thickness and mass of the positive electrode were measured to calculate a density of the positive electrode mixture layer.

[Cycle Characteristics (Capacity Maintenance Rate)]

Under a temperature condition at 25° C., a battery was charged at a constant current of 0.7 It until a battery voltage reached 4.2 V. Furthermore, the battery was charged at a constant voltage of 4.2 V until a current reached 0.05 It. Then, the battery was discharged at a constant current of 0.7 It until the battery voltage reached 2.5 V. This charge and discharge were repeated with 300 cycles, and a capacity maintenance rate was calculated by the following formula. Note that, It (A)=Rated Capacity (Ah)/1 (h).

Capacity Maintenance Rate=(Discharge Capacity at 300th Cycle/Discharge Capacity at 1st Cycle)× 100

TABLE 1

| | Positive electrode active material | | Evaluation, results | |
| | First region | Second region | Capacity maintenance rate | Filling density |
| --- | --- | --- | --- | --- |
| Example 1 | Non-aggregated particles | Secondary particles | 88% | 3.5 g/cc |
| Example 2 | Non-aggregated particles/ Secondary particles (mass ratio 7:3) | Non-aggregated particles/ Secondary particles (mass ratio 3:7) | 86% | 3.5 g/cc |
| Comparative Example 1 | Secondary particles | Non-aggregated particles | 71% | 3.5 g/cc |
| Comparative Example 2 | Non-aggregated particles | Non-aggregated particles | 89% | 3.1 g/cc |
| Comparative Example 3 | Secondary particles | Secondary particles | 68% | 3.7 g/cc |
| Comparative Example 4 | Non-aggregated particles/Secondary particles (mass ratio 1:1) | | 70% | 3.5 g/cc |

As shown in Table 1, the batteries of Examples have high capacity maintenance rates and excellent cycle characteristics. In addition, the positive electrode active material has a high filling density, and the battery capacity may be increased. Although the positive electrode of Comparative Example 1 has the same filling density as the positive electrodes of Examples, the battery of Comparative Example 1 has considerably decreased capacity maintenance rate compared with the batteries of Examples. The major cause is presumably that the secondary particles crack dining the compression of the positive electrode to block the space between the particle, which is to be the pathway of the electrolyte liquid, in the first region being on the surface side of the positive electrode mixture layer, and the supply of the electrolyte liquid to the second region being the core side of the positive electrode mixture layer is inhibited.

Comparative Example 2 has good cycle characteristics but a considerably decreased filling density of the positive electrode active material, which make it difficult to increase the capacity. Comparative Example 3 has a high filling density of the positive electrode active material but considerably deteriorated cycle characteristics due to the pathway blocking of the electrolyte liquid. In Comparative Example 3, the filling density can be regulated to 3.5 g/cc by reducing the linear pressure during the compression of the positive electrode, but the capacity maintenance rate is not improved even in this case.

The battery of Comparative Example 4 has the capacity maintenance rate equivalent to the capacity maintenance rates of the batteries of Comparative Examples 1 and 3, and the cycle characteristics are inferior to the batteries of Examples. That is, merely mixing the non-aggregated particles and the secondary particles can not improve the cycle characteristics of the battery. As in Examples, when the non-aggregated particles satisfy the relationship "the content of the non-aggregated particles in the first region the content of the non-aggregated particles in the second region, in the positive electrode mixture layer", the pathway of the electrolyte liquid can be achieved and the filling density of the positive electrode active material can be increased, leading to achievement of the non-aqueous electrolyte seconckuy battery having high capacity and excellent cycle characteristics.

REFERENCE SIGNS LIST

10 Non-aqueous electrolyte secondary battery, 11 Positive electrode, 12 Negative electrode, 13 Separator, 14 Electrode assembly, 16 Exterior horsing can, 17 Sealing assembly, 18, 19 Insulating plate. 20 Positive electrode lead, 21 Negative electrode lead, 22 Groove, 23

Internal terminal plate, 24 Lower vent member, 25 Insulating member, 26 Upper vent member, 27 Cap, 28 Gasket, 30 Positive electrode core, 31 Positive electrode mixture layer, 31a First region, 31b Second region

The invention claimed is:

1. A positive electrode for a non-aqueous electrolyte secondary battery, comprising:
   a positive electrode core; and
   a positive electrode mixture layer formed on a surface of the positive electrode core, wherein
   the positive electrode mixture layer includes: first lithium-metal composite oxide particles being non-aggregated particles having a median diameter on a volumetric basis of 2 to 10 $\mu$m; and second lithium-metal composite oxide particles being secondary particles formed by aggregation of primary particles having an average particle diameter of 50 nm to 2 $\mu$m, the secondary particles having a median diameter on a volumetric basis of 10 to 30 $\mu$m, and
   when the positive electrode mixture layer is bisected in a thickness direction and is defined as a first region and a second region in this order from a surface side of the positive electrode mixture layer, a content of the first lithium-metal composite oxide particles in the first region is larger than a content of the first lithium-metal composite oxide particles in the second region.

2. The positive electrode for a non-aqueous electrolyte secondary battery according to claim 1, wherein a content of the second lithium-metal composite oxide particles in the second region is larger than a content of the second lithium-metal composite oxide particles in the first region.

3. The positive electrode for a non-aqueous electrolyte secondary battery according to claim 1, wherein
   the first region contains the first and second lithium-metal composite oxide particles, and
   a mass ratio between the first lithium-metal composite oxide particles in the first region and the second lithium-metal composite oxide particles in the first region is 60:40 to 90:10.

4. The positive electrode for a non-aqueous electrolyte secondary battery according to claim 1, wherein
   the second region contains the first and second lithium-metal composite oxide particles, and a mass ratio between the first lithium-metal composite oxide particles in the second region and the second lithium-metal composite oxide particles in the second region is 10:90 to 40:60.

5. A non-aqueous electrolyte secondary battery, comprising:

the positive electrode for a non-aqueous electrolyte secondary battery according to claim 1;

a negative electrode; and a non-aqueous electrolyte.

\* \* \* \* \*